(12) United States Patent
Li et al.

(10) Patent No.: US 7,762,073 B2
(45) Date of Patent: Jul. 27, 2010

(54) PILOT MIXER FOR MIXER ASSEMBLY OF A GAS TURBINE ENGINE COMBUSTOR HAVING A PRIMARY FUEL INJECTOR AND A PLURALITY OF SECONDARY FUEL INJECTION PORTS

(75) Inventors: Shui-Chi Li, West Chester, OH (US); Shih-Yang Hsieh, West Chester, OH (US); George Chia-Chun Hsiao, West Chester, OH (US); Hukam Chand Mongia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1121 days.

(21) Appl. No.: 11/365,428

(22) Filed: Mar. 1, 2006

(65) Prior Publication Data
US 2009/0113893 A1 May 7, 2009

(51) Int. Cl.
*F02C 1/00* (2006.01)
*F02G 3/00* (2006.01)

(52) U.S. Cl. .............. 60/748; 60/734; 60/740; 60/737; 60/746; 60/742; 60/739; 60/738

(58) Field of Classification Search .......... 60/737, 60/740, 742, 743, 746, 747, 748, 773, 776
See application file for complete search history.

(56) References Cited
U.S. PATENT DOCUMENTS

| | | | |
|---|---|---|---|
| 5,257,502 A * | 11/1993 | Napoli | ................. 60/739 |
| 6,354,072 B1 | 3/2002 | Hura | |
| 6,363,726 B1 * | 4/2002 | Durbin et al. | ................. 60/748 |
| 6,367,262 B1 * | 4/2002 | Mongia et al. | ................. 60/748 |
| 6,381,964 B1 | 5/2002 | Pritchard, Jr. et al. | |
| 6,389,815 B1 | 5/2002 | Hura et al. | |
| 6,405,523 B1 | 6/2002 | Foust et al. | |
| 6,418,726 B1 | 7/2002 | Foust et al. | |
| 6,453,660 B1 | 9/2002 | Johnson et al. | |
| 6,484,489 B1 | 11/2002 | Foust et al. | |
| 6,711,898 B2 * | 3/2004 | Laing et al. | ................. 60/740 |
| 6,865,889 B2 | 3/2005 | Mancini et al. | |

* cited by examiner

*Primary Examiner*—Michael Cuff
*Assistant Examiner*—Craig Kim
(74) *Attorney, Agent, or Firm*—W. Scott Andes; Jonathan M. Hines; Trego, Hines & Ladenheim, PLLC (57) ABSTRACT

A mixer assembly for use in a combustion chamber of a gas turbine engine includes a pilot mixer, a main mixer, and a fuel manifold. The pilot mixer includes: an annular pilot housing having a hollow interior, a primary fuel injector mounted in the pilot housing, a plurality of axial swirlers positioned upstream from the primary fuel injector, and a plurality of secondary fuel injection ports for introducing fuel into the hollow interior of the pilot housing. The main mixer includes: a main housing surrounding the pilot housing and defining an annular cavity, a plurality of fuel injection ports, and at least one swirler positioned upstream from the plurality of fuel injection ports. The fuel manifold is in flow communication with the plurality of secondary fuel injection ports in the pilot mixer and the plurality of fuel injection ports in the main mixer.

27 Claims, 6 Drawing Sheets

PILOT MIXER FOR MIXER ASSEMBLY OF A GAS TURBINE ENGINE COMBUSTOR HAVING A PRIMARY FUEL INJECTOR AND A PLURALITY OF SECONDARY FUEL INJECTION PORTS

BACKGROUND OF THE INVENTION

The present invention relates to a staged combustion system in which the production of undesirable combustion product components is minimized over the engine operating regime and, more particularly, to a mixer assembly having a pilot mixer with a primary fuel injector and secondary fuel injection ports.

Modem day emphasis on minimizing the production and discharge of gases that contribute to smog and to other undesirable environmental conditions, particularly those gases that are emitted from gas turbine engines, have led to different combustor designs that have been developed in an effort to reduce the production and discharge of such undesirable combustion product components. Other factors that influence combustor design are the desires of users of gas turbine engines for efficient, low cost operation, which translates into a need for reduced fuel consumption while at the same time maintaining or even increasing engine output. As a consequence, important design criteria for aircraft gas turbine engine combustion systems include provision for high combustion temperatures, in order to provide high thermal efficiency under a variety of engine operating conditions, as well as the minimization of undesirable combustion conditions that contribute to the emission of particulates, and to the emission of undesirable gases, and to the emission of combustion products that are precursors to the formation of photochemical smog.

Various governmental regulatory bodies have established emission limits for acceptable levels of unburned hydrocarbons (HC), carbon monoxide (CO), and oxides of nitrogen (NOx), which have been identified as the primary contributors to the generation of undesirable atmospheric conditions. Therefore, different combustor designs have been developed to meet those criteria. For example, one way in which the problem of minimizing the emission of undesirable gas turbine engine combustion products has been attacked is the provision of staged combustion. In that arrangement, a combustor is provided in which a first stage burner is utilized for low speed and low power conditions to more closely control the character of the combustion products. A combination of first stage and second stage burners is provided for higher power outlet conditions while attempting to maintain the combustion products within the emissions limits. It will be appreciated that balancing the operation of the first and second stage burners to allow efficient thermal operation of the engine, while simultaneously minimizing the production of undesirable combustion products, is difficult to achieve. In that regard, operating at low combustion temperatures to lower the emissions of NOx, can also result in incomplete or partially incomplete combustion, which can lead to the production of excessive amounts of HC and CO, in addition to producing lower power output and lower thermal efficiency. High combustion temperature, on the other hand, although improving thermal efficiency and lowering the amount of HC and CO, often results in a higher output of NOx Another way that has been proposed to minimize the production of those undesirable combustion product components is to provide for more effective intermixing of the injected fuel and the combustion air. In that regard, numerous mixer designs have been proposed over the years to improve the mixing of the fuel and air. In this way, burning occurs uniformly over the entire mixture and reduces the level of HC and CO that result from incomplete combustion Even with improved mixing, however, higher levels of undesirable NOx are formed under high power conditions when the flame temperatures are high.

One mixer design that has been utilized is known as a twin annular premixing swirler (TAPS), which is disclosed in the following U.S. Pat. Nos. 6,354,072; 6,363,726; 6,367,262; 6,381,964; 6,389,815; 6,418,726; 6,453,660; 6,484,489; and, 6,865,889. Published U.S. patent application 2002/0178732 also depicts certain embodiments of the TAPS mixer. It will be understood that the TAPS mixer assembly includes a pilot mixer which is supplied with fuel during the entire engine operating cycle and a main mixer which is supplied with fuel only during increased power conditions of the engine operating cycle. While improvements in the main mixer of the assembly during high power conditions (i.e., take-off and climb) are disclosed in patent applications have Ser. Nos. 11/188,596, 11/188,598, and 11/188,470, modification of the pilot mixer is desired to improve operability across other portions of the engine's operating envelope (i.e., idle, approach and cruise) while maintaining combustion efficiency.

Thus, there is a need to provide a gas turbine engine combustor in which the production of undesirable combustion product components is minimized over a wide range of engine operating conditions. Further, it is desired that the pilot mixer of a nested combustor arrangement be modified to improve operability and reduce emissions over the engine's operating envelope.

BRIEF SUMMARY OF THE INVENTION

In a first exemplary embodiment of the invention, a mixer assembly for use in a combustion chamber of a gas turbine engine is disclosed as including a pilot mixer, a main mixer, and a fuel manifold. More specifically, the pilot mixer includes: an annular pilot housing having a hollow interior; a primary fuel injector mounted in the pilot housing and adapted for dispensing droplets of fuel to the hollow interior of the pilot housing; a plurality of anal swirlers positioned upstream from the primary fuel injector, each of the plurality of swirlers having a plurality of vanes for swirling air traveling through the respective swirler to mix air and the droplets of fuel dispensed by the primary fuel injector; and, a plurality of secondary fuel injection ports for introducing fuel into the hollow interior of the pilot housing. The main mixer further includes: a main housing surrounding the pilot housing and defining an annular cavity; a plurality of fuel injection ports for introducing fuel into the cavity; and, at least one swirler positioned upstream from the plurality of fuel injection ports, each of the main mixer swirlers having a plurality of vanes for swirling air traveling through the respective swirler to mix air and the droplets of fuel dispensed by the main mixer fuel injection ports. The fuel manifold is in flow communication with the plurality of secondary fuel injection ports in the pilot mixer and the plurality of fuel injection ports in the main mixer.

In a second exemplary embodiment of the invention, a method of operating a gas turbine engine combustor having a pilot mixer and a main mixer is disclosed, wherein said pilot mixer includes an annular pilot housing having a hollow interior, a primary fuel injector mounted in the pilot housing and adapted for dispensing droplets of fuel to the hollow interior of the pilot housing, a plurality of axial swirlers positioned upstream from the primary fuel injector, wherein each of the plurality of swirlers has a plurality of vanes for swirling air traveling through the respective swirler to mix air and the droplets of fuel dispensed by the primary fuel injector, and a plurality of secondary fuel injection ports for introducing fuel into the hollow interior of the pilot housing. The method includes the steps of providing air through the swirlers at a designated air flow rate, providing fuel through the primary fuel injector, and providing fuel through the secondary fuel injection ports of the pilot mixer during predetermined points in an operating cycle of the gas turbine engine.

In a third exemplary embodiment of the invention, a combustor for a gas turbine engine is disclosed as including an outer liner, an inner liner spaced radially from the outer liner so as to form a combustion chamber therebetween, a dome positioned at an upstream end of the combustion chamber, and a plurality of mixer assemblies positioned within openings of the dome. Each mixer assembly has a pilot mixer which includes: an annular pilot housing having a hollow interior; a primary fuel injector mounted in the pilot housing and adapted for dispensing droplets of fuel to the hollow interior of the pilot housing; a plurality of axial swirlers positioned upstream from the primary fuel injector, each of the plurality of swirlers having a plurality of vanes for swirling air traveling through the respective swirler to mix air and the droplets of fuel dispensed by the primary fuel injector; and, a plurality of secondary fuel injection ports for introducing fuel into the hollow interior of the pilot housing.

DETAILED DESCRIPTION OF THE INVENTION

Figure 1:
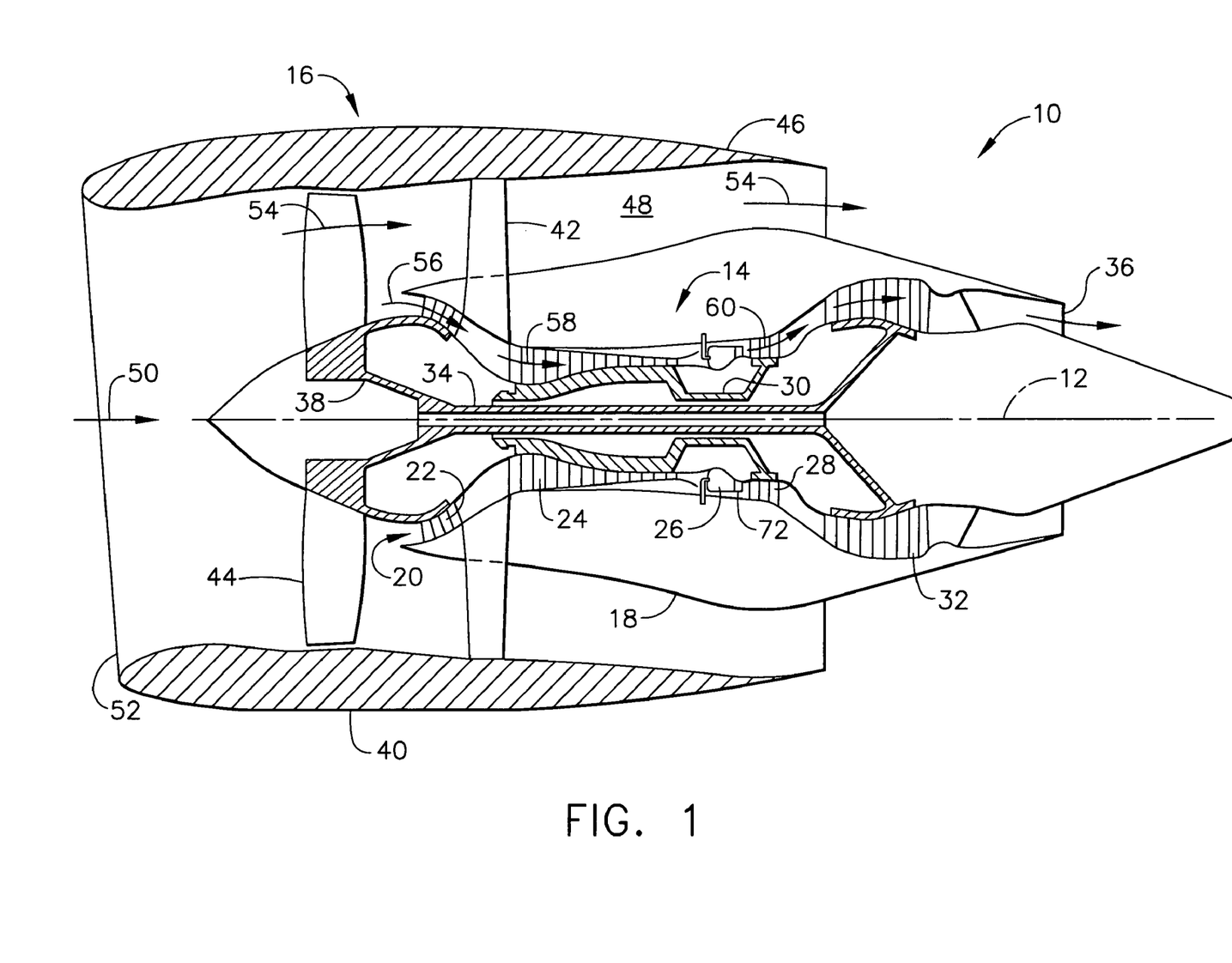
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide thrust for gas turbine engine 10.

Figure 2:
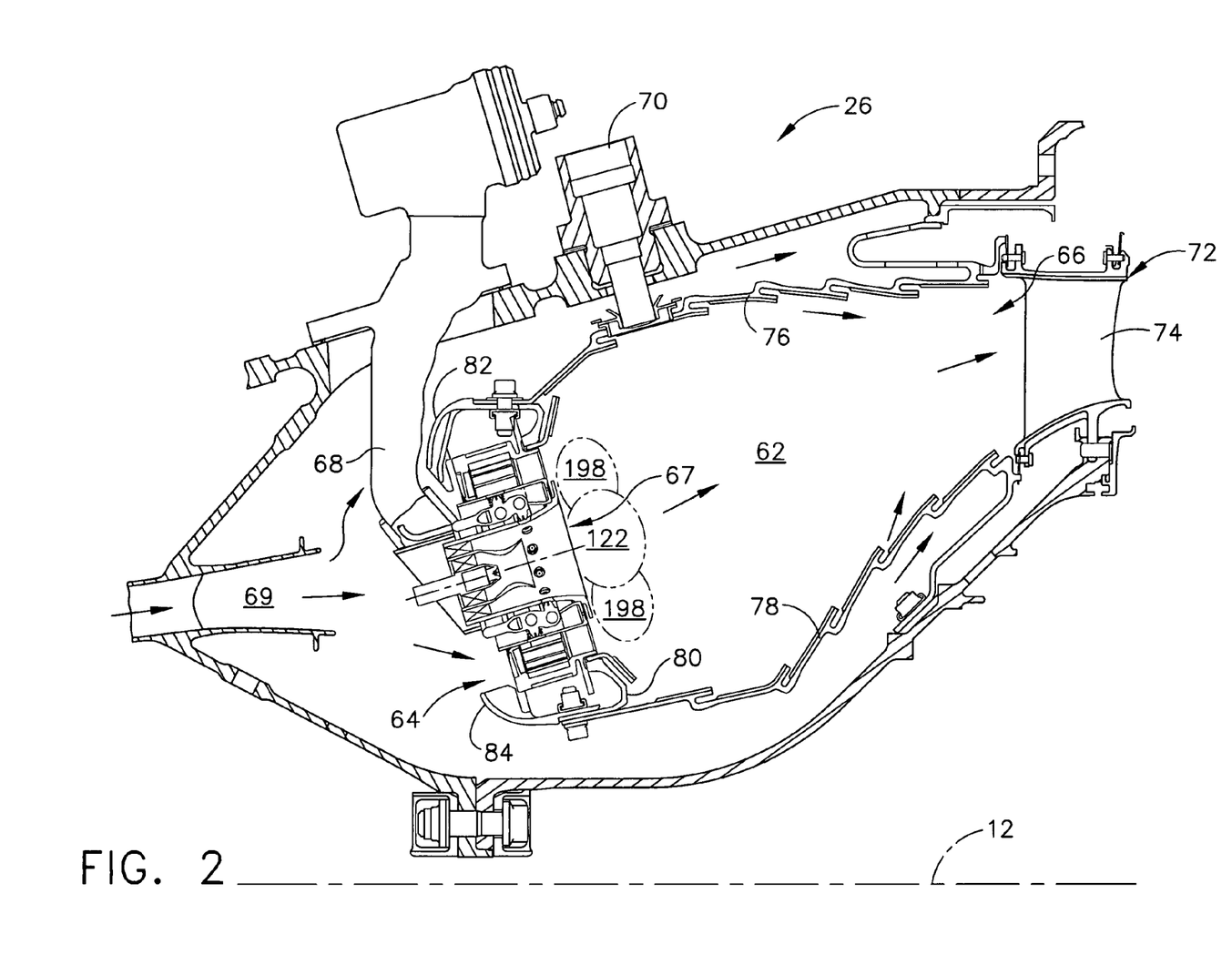
FIG. 2 is a longitudinal, cross-sectional view of a gas turbine engine combustor having a staged arrangement.

As best seen in FIG. 2, combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixing assembly 67, where fuel is also injected from a fuel nozzle 68 to mix with the air and form a fuel-air mixture that is provided to combustion chamber 62 for combustion. Ignition of the fuel-air mixture is accomplished by a suitable igniter 70, and the resulting combustion gases 60 flow in an axial direction toward and into an annular, first stage turbine nozzle 72. Nozzle 72 is defined by an annular flow channel that includes a plurality of radially-extending, circularly-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster compressor 24 and fan rotor 38 via second drive shaft 34.

Combustion chamber 62 is housed within engine outer casing 18 and is defined by an annular combustor outer liner 76 and a radially-inwardly positioned annular combustor inner liner 78. The arrows in FIG. 2 show the directions in which compressor discharge air flows within combustor 26. As shown, part of the air flows over the outermost surface of outer liner 76, part flows into combustion chamber 62, and part flows over the innermost surface of inner liner 78.

Contrary to previous designs, it is preferred that outer and inner liners 76 and 78, respectively, not be provided with a plurality of dilution openings to allow additional air to enter combustion chamber 62 for completion of the combustion process before the combustion products enter turbine nozzle 72. This is in accordance with a patent application entitled "High Pressure Gas Turbine Engine Having Reduced Emissions" and having Ser. No. 11/188,483, which is also owned by the assignee of the present invention. It will be understood, however, that outer liner 76 and inner liner 78 preferably include a plurality of smaller, circularly-spaced cooling air apertures (not shown) for allowing some of the air that flows along the outermost surfaces thereof to flow into the interior of combustion chamber 62. Those inwardly-directed air flows pass along the inner surfaces of outer and inner liners 76 and 78 that face the interior of combustion chamber 62 so that a film of cooling air is provided therealong.

It will be understood that a plurality of axially-extending mixing assemblies 67 are disposed in a circular array at the upstream end of combustor 26 and extend into inlet 64 of annular combustion chamber 62. It will be seen that an annular dome plate 80 extends inwardly and forwardly to define an upstream end of combustion chamber 62 and has a plurality of circumferentially spaced openings formed therein for receiving mixing assemblies 67. For their part, upstream portions of each of inner and outer liners 76 and 78, respectively, are spaced from each other in a radial direction and define an outer cowl 82 and an inner cowl 84. The spacing between the forwardmost ends of outer and inner cowls 82 and 84 defines combustion chamber inlet 64 to provide an opening to allow compressor discharge air to enter combustion chamber 62.

Figure 3:
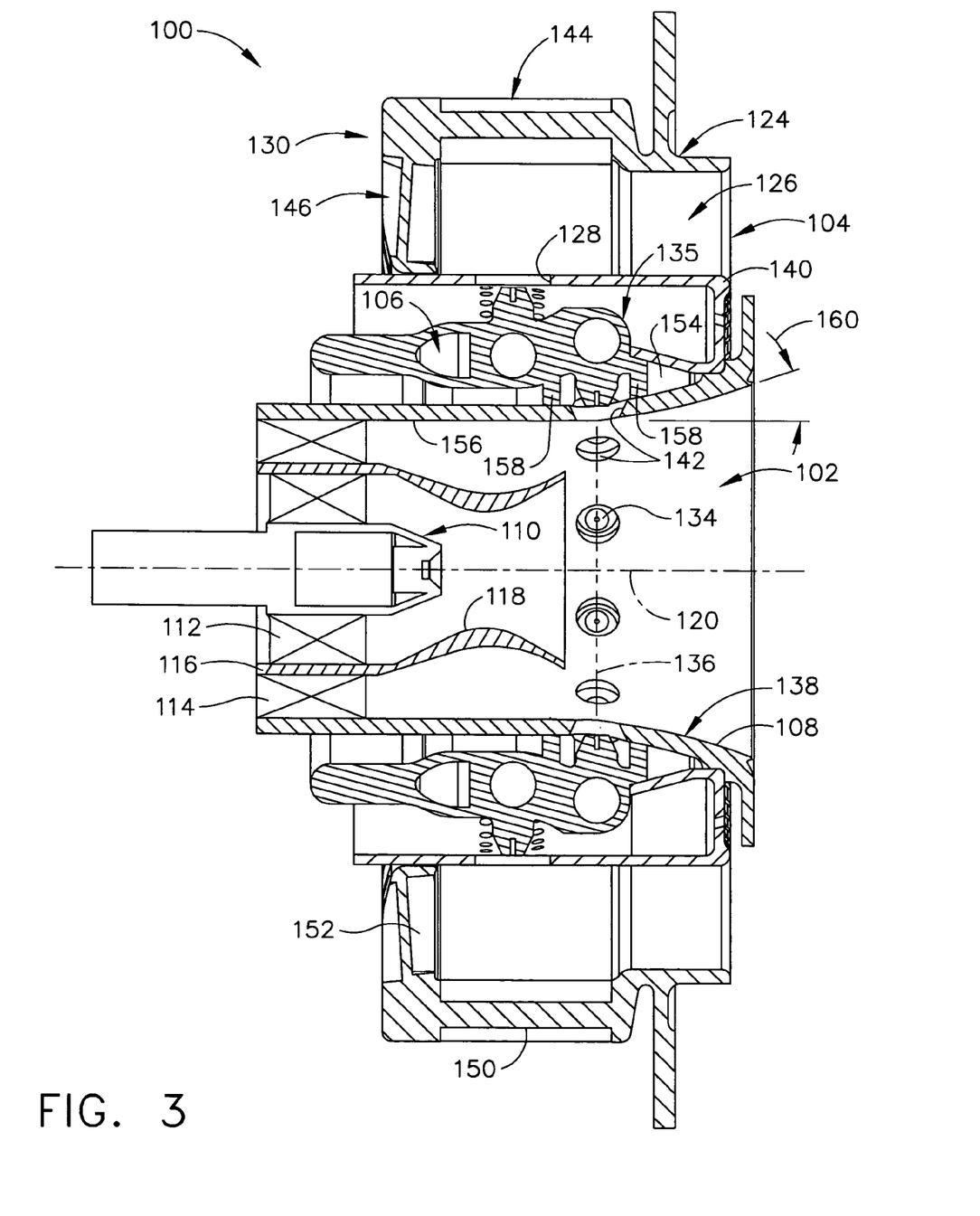
FIG. 3 is an enlarged, cross-sectional view of the mixer assembly depicted in FIG. 2.

A mixing assembly 100 in accordance with one embodiment of the present invention is shown in FIG. 3. Mixing assembly 100 preferably includes a pilot mixer 102, a main mixer 104, and a fuel manifold 106 positioned therebetween. More specifically, it will be seen that pilot mixer 102 preferably includes an annular pilot housing 108 having a hollow interior, as well as a primary fuel injector 110 mounted in housing 108 and adapted for dispensing droplets of fuel to the hollow interior of pilot housing 108. Further, pilot mixer 102 preferably includes a first swirler 112 located at a radially inner position adjacent primary fuel injector 110, a second swirler 114 located at a radially outer position from first swirler 112, and a splitter 116 positioned therebetween As shown, splitter 116 extends downstream of primary fuel injector 110 to form a venturi 118 at a downstream portion. It will be understood that first and second pilot swirlers 112 and 114 are generally oriented parallel to a centerline axis 120 through mixing assembly 100 and include a plurality of vanes for swirling air traveling therethrough. Fuel and air are provided to pilot mixer 102 at all times during the engine operating cycle so that a primary combustion zone 122 is produced within a central portion of combustion chamber 62 (see FIG. 2).

Main mixer 104 further includes an annular main housing 124 radially surrounding pilot housing 108 and defining an annular cavity 126, a plurality of fuel injection ports 128 which introduce fuel into annular cavity 126, and a swirler arrangement identified generally by numeral 130. Swirler arrangement 130 may be configured in any of several ways, as seen in a patent application entitled "Mixer Assembly For Combustor Of A Gas Turbine Engine Having A Plurality Of Counter-Rotating Swirlers" having Ser. No. 11/188,596 and a patent application entitled "Swirler Arrangement For Mixer Assembly Of A Gas Turbine Engine Combustor Having Shaped Passages" having Ser. No. 11/188,595, both of which are assigned to the owner of the present invention. It will be seen in FIG. 3, however, that swirler arrangement 130 preferably includes at least a first swirler 144 positioned upstream from fuel injection ports 128. As shown, first swirler 144 is preferably oriented substantially radially to centerline axis 120 through mixer assembly 100. It will be noted that first swirler 144 includes a plurality of vanes 150 for swirling the air flowing therebetween. Since vanes 150 are substantially uniformly spaced circumferentially, a plurality of substantially uniform passages are defined between adjacent vanes 150. It will further be understood that swirler 144 may include vanes having different configurations so as to shape the passages in a desirable manner, as disclosed in the '595 patent application identified hereinabove.

Swirler arrangement 130 also is shown as including a second swirler 146 positioned upstream from fuel injection ports 128 and preferably oriented substantially parallel to centerline axis 120. Second swirler 146 further includes a plurality of vanes 152 for swirling the air flowing therebetween. Although vanes 152 are shown as being substantially uniformly spaced circumferentially, thereby defining a plurality of substantially uniform passages therebetween, such vanes 152 may also have different configurations so as to shape the passages in a desirably manner.

Fuel manifold 106, as stated above, is located between pilot mixer 102 and main mixer 104 and is in flow communication with a fuel supply. Fuel injection ports 128 are in flow communication with fuel manifold 106 and spaced circumferentially around centerbody outer shell 140. As seen in FIG. 3, fuel injection ports 128 are preferably positioned so that fuel is provided in an upstream end of annular cavity 126.

When fuel is provided to main mixer 104, an annular, secondary combustion zone 198 is provided in combustion chamber 62 that is radially outwardly spaced from and concentrically surrounds primary combustion zone 122. Depending upon the size of gas turbine engine 10, as many as twenty or so mixer assemblies 100 can be disposed in a circular array at inlet 64 of combustion chamber 62.

Figure 4:
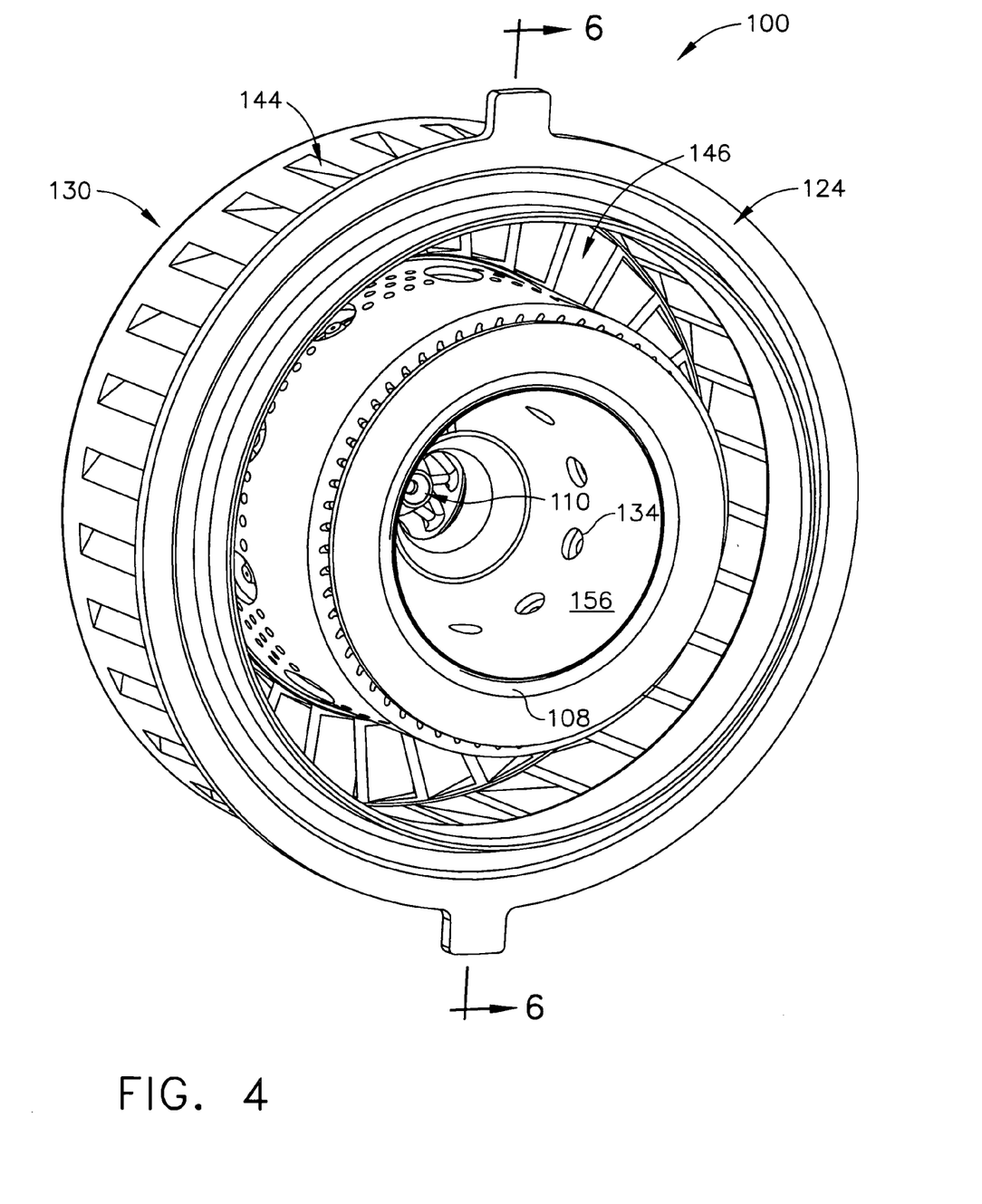
FIG. 4 is an aft perspective view of the mixer assembly depicted in FIGS. 2 and 3.
Figure 6:
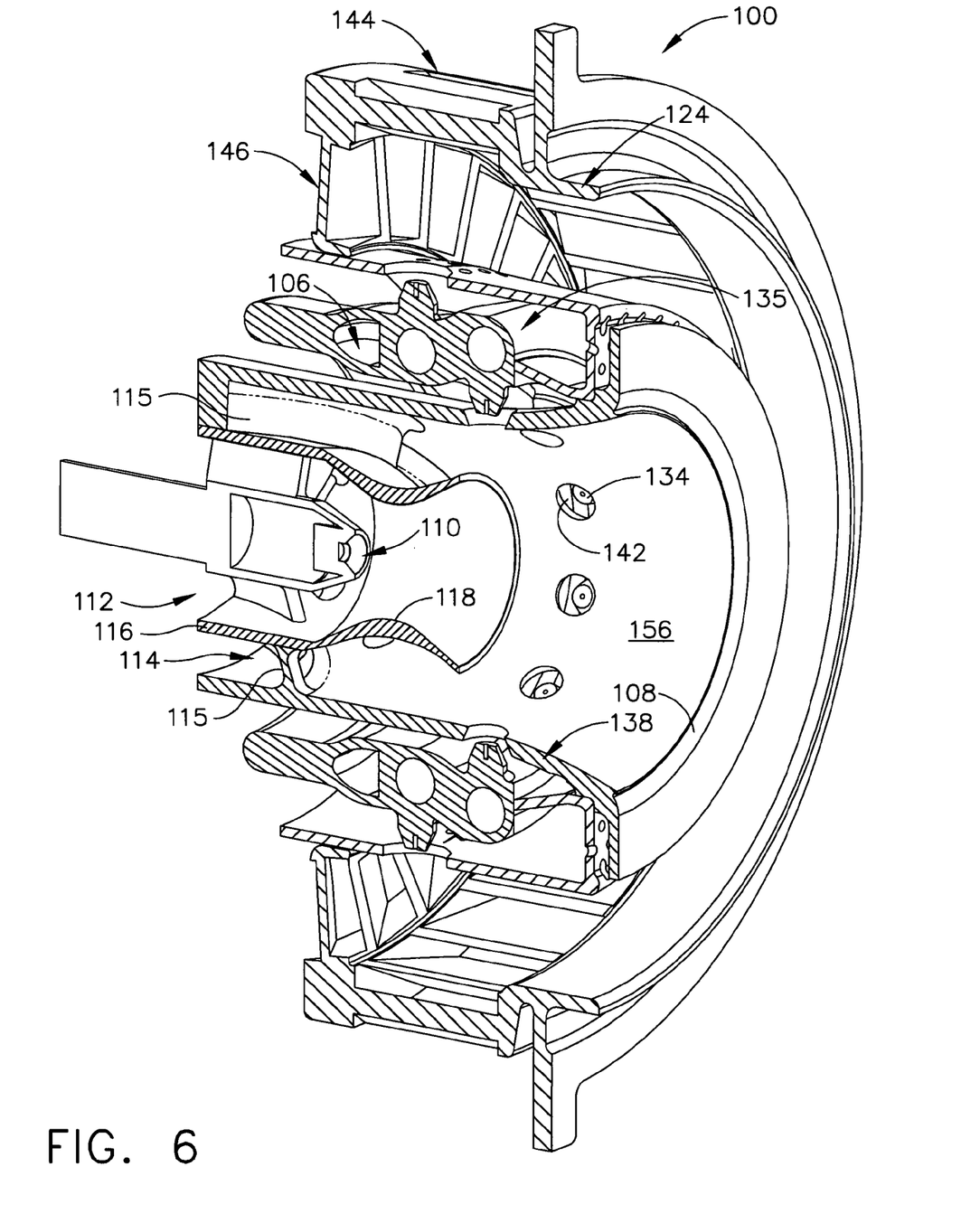

As best seen in FIGS. 3, 4, and 6, pilot mixer 102 further includes a plurality of spaced secondary fuel injection ports 134, whereby fuel is also introduced into hollow interior of pilot housing 108. It will be appreciated that secondary fuel injection ports 134 are preferably spaced circumferentially about pilot housing 108 within a designated plane 136 intersecting centerline axis 120 through mixing assembly 100. While plane 136, in which secondary fuel injection ports 134 lie, is shown as being located in a flared portion 138 of pilot housing 108 downstream of splitter 116, it will be understood that a plane containing such secondary fuel injection ports 134 may be located at approximately a downstream end of splitter 116 or even upstream thereof. Indeed, the axial length of splitter 116 may be altered so that its relationship with the location of secondary fuel injection ports 134 could change.

Similarly, plane 136 is depicted as being oriented substantially perpendicular to centerline axis 120, but secondary fuel injection ports 134 may be positioned so that plane 136 is skewed so as to be angled either upstream or downstream as desired. Further, regardless of the axial position or orientation of plane 136 containing secondary fuel injection ports 134, each such secondary fuel injection port 134 may individually be oriented substantially perpendicular to centerline axis 120, oriented upstream at an acute angle, or oriented downstream at an obtuse angle.

Figure 5:
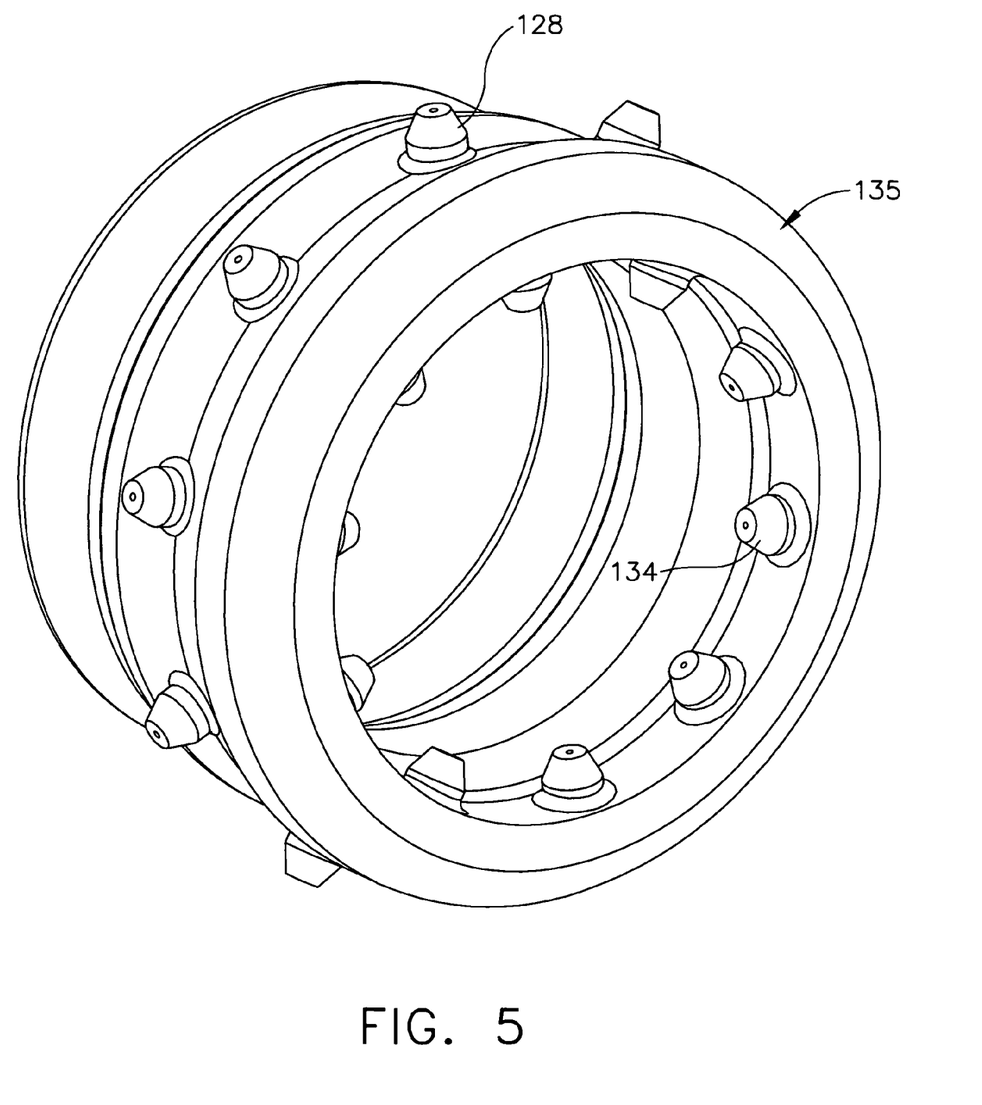
FIG. 5 is an aft perspective view of a portion of the mixer assembly depicted in FIGS. 2-4; and, FIG. 6 is a partial perspective view of the mixer assembly depicted in FIGS. 2-4, taken along line 6-6 in FIG. 4.

It will further be seen that secondary fuel injection ports 134 of pilot mixer 102 preferably are in flow communication with fuel manifold 106, although it could receive fuel from a separate source. As seen in FIG. 5, secondary fuel injection ports 134 may be incorporated into a one piece fuel injection assembly 135 with fuel injection ports 128 of main mixer 104. In any event, fuel is typically injected into the hollow portion of pilot housing 108 by secondary fuel injection ports 134 upon the occurrence of a specified event (e.g., a designated cycle point for gas turbine engine 10, when compressor discharge air 58 is a designated temperature, etc.). Depending upon the requirements of a specific condition, fuel is injected through secondary fuel injection ports 134 at a rate greater than, less than or substantially the same as fuel injected through primary fuel injector 110. Of course, this presumes that fuel will be provided by primary fuel injector 110 at all times, but there may be occasions when it is preferable to provide fuel to pilot mixer 102 only through secondary fuel injection ports 134.

In this way, pilot mixer 102 has greater flexibility during operation across the lower power conditions (i.e., idle, approach and cruise). In particular, it will be appreciated that pilot mixer 102 is able to power gas turbine engine 10 up to approximately 30% of maximum thrust when fuel is provided solely to primary fuel injector 110. By comparison, pilot mixer 102 is able to power gas turbine engine 10 up to approximately 70% of maximum thrust when fuel is provided to secondary fuel injection ports 134 as well.

In order to promote the desired fuel spray into the hollow interior of pilot housing 108, it is preferred that a passage 142 surround each secondary fuel injection port 134 of pilot mixer 102. Each passage 142 is in flow communication with compressed air via a supply 154 adjacent to fuel manifold 106. This air is provided to facilitate injection of the fuel spray into pilot housing 108 instead of being forced along an inner surface 156 thereof This may further be enhanced by providing a swirler 158 within each passage 142 which provides a swirl to the air injected around the fuel spray.

It is also preferred that vanes 115 of outer pilot swirler 114 (see FIG. 6) be configured so that air passing therethrough is directed at least somewhat toward inner surface 156 of pilot housing 108. In this way, such air is better able to interact with fuel provided by secondary fuel injection ports 134. Accordingly, vanes 115 are preferably angled at approximately 30° to about 60° with respect to centerline axis 120.

In this way, a flare angle 160 of pilot housing 108 is approximated.

Considering the addition of secondary fuel injection ports 134 in pilot mixer 102, it will be appreciated that the flow rate of air therethrough is preferably maintained at a rate of approximately 10% to approximately 30%. Further, such secondary injection ports 134 assist in reducing the emissions produced by mixer assembly 100 during the operation of gas turbine engine 10. In particular, combustor 26 is able to operate only with fuel being supplied to pilot mixer 102 for a greater time period Also, it has been found that providing more fuel at a radially outer location of pilot mixer 102 is desirable.

In conjunction with the physical embodiments of mixer assembly 100, it will be understood that a method of operating combustor 26 having pilot mixer 102 as described herein is also presented. More specifically, such method includes the following steps: providing air through pilot swirlers 112 and 114 at a designated flow rate; providing fuel through primary fuel injector 110; and, providing fuel through secondary fuel injection ports 134 during predetermined conditions in combustor 26 and/or an operating cycle of gas turbine engine 10. Further, such method may include additional steps with respect to the operation of main mixer 104, including: providing air through main swirlers 144 and 146; and, providing fuel through fuel injection ports 128 during predetermined conditions in combustor 26 and/or the operating cycle of gas turbine engine 10. While fuel will generally be provided to pilot mixer 102 through secondary fuel injection ports 134 when fuel is also being provided through primary fuel injector 110, there may be certain conditions when fuel is provided only by secondary fuel injection ports 134 and not concurrently by primary fuel injector 110.

Although particular embodiments of the present invention have been illustrated and described, it will be apparent to those skilled in the art that various changes and modifications can be made without departing from the spirit of the present invention. Accordingly, it is intended to encompass within the appended claims all such changes and modification that fall within the scope of the present invention.

What is claimed is:

1. A mixer assembly for use in a combustion chamber of a gas turbine engine, said assembly comprising:
 (a) a pilot mixer having multiple stages including:
  (1) an annular pilot housing having a hollow interior;
  (2) a primary fuel injector mounted in said pilot housing and adapted for dispensing droplets of fuel to said hollow interior of said pilot housing;
  (3) a plurality of axial swirlers positioned upstream from said primary fuel injector, each of said plurality of swirlers having a plurality of vanes for swirling air traveling through the respective swirler to mix air and the droplets of fuel dispensed by said primary fuel injector; and,
  (4) a plurality of secondary fuel injection ports for introducing fuel into said hollow interior of said pilot housing, wherein a fuel supply path to the secondary fuel injection ports is independent from a fuel supply path to the primary fuel injector; and,
 (b) a main mixer including:
  (1) a main housing surrounding said pilot housing and defining an annular cavity;
  (2) a plurality of fuel injection ports for introducing fuel into said cavity; and,
  (3) at least one swirler positioned upstream from said plurality of fuel injection ports, each of said main mixer swirlers having a plurality of vanes for swirling air traveling through the respective swirler to mix air and the droplets of fuel dispensed by said main mixer fuel injection ports; and,
 (c) a fuel manifold in flow communication with said plurality of secondary fuel injection ports in said pilot mixer and said plurality of fuel injection ports in said main mixer.

2. The mixer assembly of claim 1, said pilot mixer further comprising:
 (a) a first axial swirler positioned upstream from said primary fuel injector having a plurality of vanes for swirling air traveling therethrough;
 (b) a second axial swirler positioned upstream from said primary fuel injector and radially outside said first axial swirler having a plurality of vanes for swirling air traveling therethrough; and,
 (c) a splitter positioned between said first and second axial swirlers and extending downstream to a venturi portion.

3. The mixer assembly of claim 2, wherein said second swirler is configured to direct air toward an inner surface of said pilot housing.

4. The mixer assembly of claim 3, wherein vanes in said second swirler have an angle in a range of about 30° to about 60° with respect to a centerline axis through said pilot housing.

5. The mixer assembly of claim 1, wherein said secondary fuel injection ports of said pilot mixer are circumferentially spaced within a designated plane intersecting a centerline axis through said pilot housing.

6. The mixer assembly of claim 2, wherein said secondary fuel injection ports of said pilot mixer are positioned downstream of said splitter.

7. The mixer assembly of claim 2, wherein said secondary fuel injection ports of said pilot mixer are positioned substantially within a plane at a downstream end of said splitter.

8. The mixer assembly of claim 2, wherein said secondary fuel injection ports of said pilot mixer are positioned upstream of an aft end for said splitter.

9. The mixer assembly of claim 1, wherein said secondary fuel injection ports of said pilot mixer are oriented substantially perpendicular to a centerline axis through said pilot housing.

10. The mixer assembly of claim 1, wherein said secondary fuel injection ports of said pilot mixer are oriented so as to be angled toward an upstream end of said pilot housing.

11. The mixer assembly of claim 1, wherein said secondary fuel injection ports of said pilot mixer are oriented so as to be angled toward a downstream end of said pilot housing.

12. The mixer assembly of claim 1, wherein said secondary fuel injection ports of said pilot mixer are formed in a flared portion of said pilot housing.

13. The mixer assembly of claim 1, wherein fuel is injected from said secondary fuel injection ports of said pilot mixer into said downstream end of said pilot mixer at a designated cycle point for said gas turbine engine.

14. The mixer assembly of claim 1, wherein fuel is injected from said secondary fuel injection ports of said pilot mixer into said downstream end of said pilot mixer when compressor discharge air of said gas turbine engine is at a designated temperature.

15. The mixer assembly of claim 1, wherein fuel is injected from said primary fuel injector at a faster rate than fuel injected from said secondary fuel injection ports of said pilot mixer.

16. The mixer assembly of claim 1, wherein fuel is injected from said primary fuel injector and said secondary fuel injection ports of said pilot mixer at substantially the same rate.

17. The mixer assembly of claim 1, wherein fuel is injected from said secondary fuel injection ports of said pilot mixer at a faster rate than fuel injected from said primary fuel injector.

18. The mixer assembly of claim 1, wherein said pilot mixer is able to power said gas turbine engine up to approximately 30% of maximum thrust when fuel is provided only from said primary fuel injector.

19. The mixer assembly of claim 1, wherein said pilot mixer is able to power said gas turbine engine up to approximately 70% of maximum thrust when fuel is provided by said primary fuel injector and said secondary fuel injection ports.

20. The mixer assembly of claim 1, further comprising a passage surrounding each secondary fuel injection port of said pilot mixer in flow communication with an air supply.

21. The mixer assembly of claim 20, further comprising a swirler member positioned within said passage so as to swirl air flowing therethrough.

22. The mixer assembly of claim 1, wherein an air flow rate through said pilot mixer is at least about 10%.

23. The mixer assembly of claim 1, wherein an air flow rate through said pilot mixer is no greater than about 30%.

24. A method of operating a gas turbine engine combustor having a pilot mixer with multiple stages and a main mixer, wherein said pilot mixer includes an annular pilot housing having a hollow interior, a primary fuel injector mounted in said pilot housing and adapted for dispensing droplets of fuel to said hollow interior of said pilot housing, a plurality of axial swirlers positioned upstream from said print fuel injector, wherein each of said plurality of swirlers has a plurality of vanes for swirling air traveling through the respective swirler to mix air and the droplets of fuel dispensed by said primary fuel injector, and a plurality of secondary fuel injection ports for introducing fuel into said hollow interior of said pilot housing, said method comprising the following steps:
    (a) providing air through said pilot mixer swirlers at a designated air flow rate;
    (b) providing fuel through said primary fuel injector; and,
    (c) providing fuel through said secondary fuel injection ports of said pilot mixer during predetermined conditions;
    (d) providing air through said main mixer swirlers at a designated air flow rate;
    (e) providing fuel through fuel injection ports of said main mixer during predetermined conditions.

25. The method of claim 24, wherein fuel is provided through said secondary fuel injection ports of said pilot mixer while fuel is provided through said primary fuel injector.

26. The method of claim 24, wherein fuel is provided through said secondary fuel injection ports of said pilot mixer when fuel is not provided through said primary fuel injector.

27. A combustor for a gas turbine engine, comprising:
    (a) an outer liner;
    (b) an inner liner spaced radially from said outer liner so as to form a combustion chamber therebetween;
    (c) a dome positioned at an upstream end of said combustion chamber;
    (d) a pilot mixer having multiple stages including:
        (1) an annular pilot housing having a hollow interior;
        (2) a primary fuel injector mounted in said pilot housing and adapted for dispensing droplets of fuel to said hollow interior of said pilot housing;
        (3) a plurality of axial swirlers positioned upstream from said primary fuel injector, each of said plurality of swirlers having a plurality of vanes for swirling air traveling through the respective swirler to mix air and the droplets of fuel dispensed by said primary fuel injector; and,
        (4) a plurality of secondary fuel injection ports for introducing fuel into said hollow interior of said pilot housing, wherein a fuel supply oath to the secondary fuel injection ports is independent from a fuel supply oath to the primary fuel injector; and,
    (e) a main mixer including:
        (1) a main housing surrounding said pilot mixer and defining an annular cavity;
        (2) a plurality of fuel injection ports for introducing fuel into said cavity; and,
        (3) at least one swirler positioned upstream from said plurality of fuel injection ports, each of said main mixer swirlers having a plurality of vanes for swirling air traveling through the respective swirler to mix air and the droplets of fuel dispensed by said main mixer fuel injection ports; and,
    (f) a fuel manifold in flow communication with said plurality of secondary fuel injection ports in said pilot mixer and said plurality of fuel injection ports in said main mixer.

* * * * *